H. D. PERKY, DEC'D.
L. SPARKS, ADMINISTRATOR.
FORM OF FOOD FROM GRAIN AND METHOD OF MANUFACTURING THE SAME.
APPLICATION FILED MAR. 17, 1906.

1,060,702.

Patented May 6, 1913.

Witnesses

Inventor
Henry D. Perky
By E. W. Anderson
his Attorney

UNITED STATES PATENT OFFICE.

HENRY D. PERKY, OF GLENCOE, MARYLAND; LABAN SPARKS, ADMINISTRATOR OF SAID HENRY D. PERKY, DECEASED, ASSIGNOR, BY MESNE ASSIGNMENTS, TO THE SHREDDED WHEAT COMPANY, OF NIAGARA FALLS, NEW YORK.

FORM OF FOOD FROM GRAIN AND METHOD OF MANUFACTURING THE SAME.

1,060,702. Specification of Letters Patent. Patented May 6, 1913.

Application filed March 17, 1906. Serial No. 306,690.

*To all whom it may concern:*

Be it known that I, HENRY D. PERKY, a citizen of the United States, and resident of Glencoe, in the county of Baltimore and State of Maryland, have made a certain new and useful Invention in a Form of Food from Grain and Method of Manufacturing the Same; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
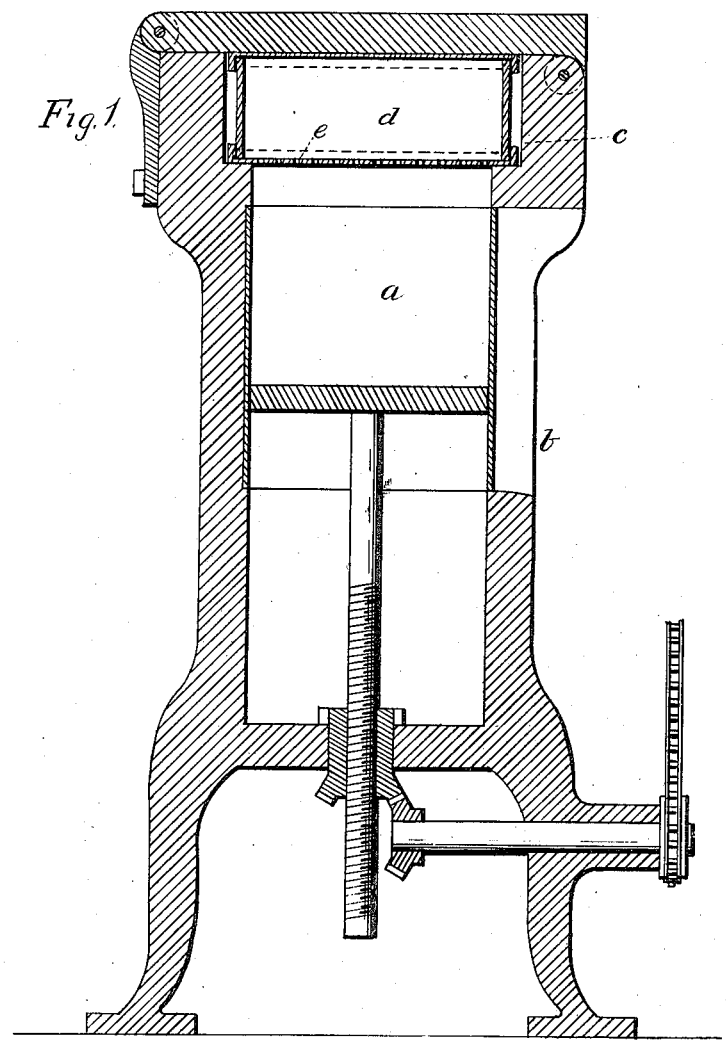
Figure 2:
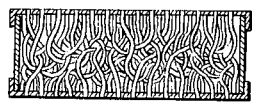
Figure 3:
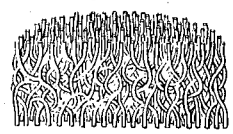

Figure 1 is a sectional view of a machine which may be used in carrying out the process. Fig. 2 is a sectional view of the mold or form. Fig. 3 is a perspective sectional view of the biscuit.

The object of the invention is the preparation of cereal food in a novel, palatable and attractive form, and it consists in a new process of manufacture, and in the product thereof, as hereinafter set forth.

In this invention, it is designed, first, to cook the flour or meal so as to provide a plastic or semi-solid mass; second, to press this material into a mold or former through perforations of fine character, whereby the material becomes fibrillated or thread-like as it passes into the mold, filling the same; third, to hold the superficial ends of the constituent threads in normal separated position in the mold; fourth, to heat the mold and its contents in an oven or drier, and finally to discharge the product entire from the mold in finished form.

In the accompanying drawings, illustrating a form of apparatus which may be used in carrying out the invention, the letter *a*, designates a cylinder in which the material may be cooked. Or, the cylinder may be used to take the material from a vessel in which it is already prepared.

The cylinder with its contents is designed to be placed in a pressing machine *b*, having a seat *c*, for a mold *d*, which is provided with perforations in the separable plate *e*, which forms the bottom of the mold. Or both bottom and top of the mold may consist of separable plates, as indicated in Fig. 2.

By operating the screw of the pressing machine, the material in the cylinder is forced into the mold, which becomes filled with the fine threads to which the material is reduced by its passage through the perforations of the plate *e*. The threads become intermingled in the mold, and adhere to each other in an openwork manner, so that the interior of the biscuit will be more or less of openwork character. The mold, with its plate *e*, is then removed from the seat *c*, of the press, and, the ends of the filaments being detached by such removal from the material in the press, is placed in a heating oven until its contents is dry, and then the contents of the mold is discharged therefrom in biscuit form.

The mold shown in the drawing represents a tin cylinder having removable plane top and bottom plates. In Fig. 1 the bottom plate is shown perforated, and in Fig. 2 both bottom and top plates are perforated. The perforations are finely distributed. It is designed preferably to have the ends of the filaments project in both top and bottom of the biscuit, and to this end, the mold having perforated top and bottom plates can be reversed in the press after partial filling through one plate, in order to complete the filling through the other plate.

The threads, being very slender, break, on the removal of the mold from the press, at the perforations, and the ends adhere to the perforations of the plate sufficiently long to enable the mold to be taken to the oven or drier, and the biscuit cooked. When the mold is opened, the ends of the filaments part readily from the perforated plate and, remaining with the intermingled adhering threads which form the interior portion of the biscuit, project therefrom normally in the superficial portion, in a separated manner to provide a papillary surface.

The product is an exceedingly light and tender biscuit composed of fine fibrillated threads intermingled in a more or less open manner in the interior portion between the broad surface or surfaces of its superficial portion at top and bottom of the biscuit, which are designed to be of papillary character, being formed mainly of the ends of such threads. These threads extend in a more or less convoluted manner, so as to produce an openwork structure which terminates in superficial ends or projections normal to the breadth of the biscuit. Such a structure is believed to be especially suitable for a biscuit, making it tender or short in texture, particularly so at its upper and lower superficial portions, whereby it is designed that this biscuit shall be more readily bitten and masticated than one in which the texture is incumbent or lies broadwise of the surface and therefore has a more continuous and tough or crust-like character. It is designed in this biscuit to avoid a horizontal or layer structure, which is apt to become compact and heavy on account of the weight of the material, especially when no yeast or leavening is employed. On the contrary, its structure is in the interior portion of more or less convoluted character, and vertical in the superficial portions or top and bottom, and because of its interstices, of very light character, as the threads are held in position by their ends, which remain attached to the perforated plate until the biscuit is formed and dried or baked in the mold. The separated and distributed ends of the threads, which stud the surface, are surrounded by the interspaces of the deeper structure in which the threads adhere to each other more or less.

Having described the invention, what I claim and desire to secure by Letters Patent is—

1. The process of making biscuit, consisting in first, cooking the flour or meal to provide a plastic or semi-solid mass; second, reducing the material to filaments within a mold, filling the same; third, holding the superficial ends of these filaments in separate position normal to the body portion of the biscuit; fourth, heating the mold and its contents in an oven or drier, and finally discharging the product.

2. A molded biscuit having an interior portion consisting of fine convoluted threads connected together in an openwork manner, and an outer portion consisting of normally projecting ends of said threads forming a papillary surface.

In testimony whereof I affix my signature, in presence of two witnesses.

HENRY D. PERKY.

Witnesses:
WM. C. BREED,
L. S. BURBANK.